United States Patent Office 3,257,366
Patented June 21, 1966

3,257,366
METHOD OF PARTIALLY CRYSTALLIZING AN ALPHA-OLEFIN POLYMER
George Clark Monroe, Jr., Orange, Tex., and Daniel James Vaughan, Wilmington, Del., assignors to E. I. du Pont de Nemours and Company, Wilmington, Del., a corporation of Delaware
No Drawing. Filed June 19, 1961, Ser. No. 117,829
7 Claims. (Cl. 260—41)

This application is a continuation-in-part of United States patent application 656,202, filed May 1, 1957.

This invention relates to nucleation of crystallizable thermoplastic polymeric materials and particularly to nucleation of polyethylene and other partially crystallizable alkene-1 polymers by incorporating small amounts of solid additives therein.

For many years it has been known that fillers such as titania, zinc oxide, carbon black, silica and the like could be incorporated in polyethylene and other thermoplastic materials to produce desirable characteristics, such as opacity, increased stiffness, etc. Usually these fillers also had the undesirable effect of decreasing toughness. More recently, it has been reported that when silica is employed as a filler for polyethylene, the composition is especially well suited for certain uses when the particle size is submicroscopic, e.g. approximately 50 millimicrons as a maximum.

The quantity of filler employed in these previously known applications has been quite substantial, namely about 5 to 80% of the weight of polyethylene or other resin (cf. British Patents 532,665 and 729,669).

The present invention is based upon the discovery of a phenomenon which is functionally unrelated to these previously known effects of fillers. Actually, the phenomenon which the present applicants have discovered occurs even when the quantity of additive is too small to produce any of the effects normally associated with fillers.

It has been discovered in accordance with this invention that solid particles having diameters of less than about 1 micron, but most effectively below 500 millimicrons, and preferably 1 to 20 millimicrons, when present to the extent of not more than 0.5%, preferably not more than 1,000 parts per million (wt.), in molten polymeric material capable of partial crystallization, have a pronounced effect on polymer properties, especially those properties which are related to the rate of crystallite and spherulite growth.

Among the properties which are affected by this phenomenon are toughness and the frictional properties of the polymer surfaces. This in itself is an unexpected discovery. In contrast with previous experience, it is now found that additives which control crystallization can be used, in the quantities herein disclosed, to control the surface properties of polymer films.

The preferred additives which are effective in the practice of this invention are of a siliceous character, such as modified silicas, and silicates. Suitable forms of siliceous solids are available commercially and are characterized by ultimate particle sizes in the 5 to 10 millimicron range. Estersils, i.e. supercolloidal amorphous silica coated with alkoxy groups, are quite suitable. Other solids which have been found effective when present in the form of particles of about this same size are silica (e.g. supercolloidal amorphous hydrophilic silica), ammonium perfluoroheptane carboxylate, alumina, sodium chloride, calcium chloride, potassium bromide, calcium carbonate, monosodium phosphate, disodium phosphate, aluminum trichloride, potassium nitrate, aluminum phosphate, aluminum acetate, aluminum sulfate, and sodium sulfate. It is apparent that the substances which have the desired effect are solid under the polymer crystallization conditions and are further characterized by insolubility in the polymer, small (preferably colloidal or supercolloidal) ultimate size of particles, and chemical inertness, i.e. stability under the conditions of crystallization.

If desired, other additives may also be present, such as oleamide, ethylene distearamide, or other fatty acid amides. The quantity of amide may be from 0.01% to 0.5% (wt.) of polyethylene or other hydrocarbon polymer.

The polymers which are employed most effectively in the practice of this invention are those which form very viscous melts. The latter class of polymers is exemplified by polymers of olefin hydrocarbons having terminal ethylenic unsaturation, e.g. the alkene-1 polymers (i.e. alkene-1 homopolymers, and copolymers from alkene-1 monomers as sole components), which are partially crystallizable. Specific examples are branched polyethylene, ethylene-higher alkene-1 copolymers, polypropylene, linear polyethylene, crystallizable polystyrene, diene polymers which are crystallizable in an unstressed condition, and crystallizable hydrocarbon polymers in general.

The invention can best be illustrated with branched polyethylene, and it is to be understood that the procedures described hereinbelow can be used with other polymers.

In polyethylene, the additives improve block, brittleness, haze and transparency to a marked extent and also improve other properties, such as slip, in many instances.

From the practical and theoretical standpoint, it is especially noteworthy that haze is improved, since this implies the formation of smaller more uniform crystallites and spherulites.

The fact that both transparency and blocking properties can thus be improved is quite remarkable because transparency in branched polyethylene is known to be a surface phenomenon, and one would expect improved transparency to be generally associated with poorer blocking properties (smoother surfaces). The present invention is thus extremely valuable in that it provides a method for improving both transparency and blocking tendency, simultaneously. A probable explanation is that the surface, though smoother, has less tack, i.e. the phenomenon may be associated with a decreased surface tackiness, evidently resulting from a more rapid crystallization, due to the more numerous heterogeneous nuclei which have been introduced into the composition.

The improvement in brittleness is also highly valuable and is probably associated with the decreased size and increased degree of uniformity of the crystal structure, which prevents planes of cleavage from occurring in extruded film, for example.

Various methods may be employed for introducing the additive into the polymer. One suitable method is to introduce the additive during or prior to polymerization. Another is to prepare a concentrate of the additive in the polymer, mill it in a Banbury mill, subdivide the resulting concentrate by means of a cube-cutter or similar device, dry-blend the concentrate with more polymer, and extrude the blend in a suitable mixer-extruder. Another method is to prepare a concentrate by means of a Banbury mixer, completing the dispersion in such a mixer at elevated temperature (105° to 135° C.) for a suitable period (e.g. 15 minutes); the product can be directly extruded and, if desired, finely subdivided in any suitable device. Any of the other conventional methods of mixing, such as through the use of liquid media as mixing aids, may be employed.

When the solid particulate additive consists of an alkali metal halide, some difficulty may be experienced in making an intimate mixture of halide salt particles of suitable particle size with the partially crystalline thermoplastic hydrocarbon polymer.

A particularly effective method of preparing partially crystaline thermoplastic hydrocarbon polymers nucleated with the halide salts of sodium, potassium, rubidium and caesium comprises the following sequences of steps:

(1) The solid, partially crystalline hydrocarbon polymer is reduced to a finely divided powder, generally having a particle size less than about $10\mu$.

(2) The powder is thoroughly wetted from 1 to 10 parts by weight of a solution containing an amount of the selected halide of sodium potassium, rubidium or caesium in an amout not exceeding 0.5% by weight of the polymer in a water-miscible non-solvent for the polymer selected from the alcohols containing from 1 to 4 carbon atoms and aliphatic ketones containing from 3 to 5 carbon atoms together with the minium quantity of water necessary to dissolve the salt.

(3) The wetted powder is then dried at a temperature below the crystalline melting point of the polymer.

When this procedure is followed, the alkali metal halide is deposited in the form of microscopic crystals having a particle size less than the critical particle size of about $1.0\mu$ in intimate mixture with the polymer. The mixture thus found may be melt fabricated to yield articles, such as sheets, fibers, film and the like, without additional mixing in the molten state. The polymers are characterized by a rate of crystallization which is greatly in excess of the rate of crystallization of the corresponding unnucleated polymer, and by smaller spherulitic size, or even the absence of observable spherulitic structures. These properties lead to greatly improved transparency and smooth, wax glossy surface finishes in the fabricated articles.

The first step, that of reducing the solid hydrocarbon polymer to a finely divided powder, may be prepared in many ways. An extremely effective method is to make a hot solution of the partially crystalline polymer in a suitable solvent to form a solution containing less than about 5% by weight of the polymer, and then to pour the solution into about 2 to 5 times its volume of a non-solvent, the non-solvent being rigorously agitated during the process. The polymer is precipitated in a finely divided form suitable for use in the wet mixing process.

Suitable solvents and non-solvents are well-known in the field of polymer chemistry. Preferably, the solvent is an aromatic hydrocarbon, such as benzene, toluene, xylene, alpha-chloronaphthalene or the like. In some cases, heating under pressure may be employed in order to obtain a suitable solution.

The non-solvent may be an oxygenated organic compound such as a liquid alcohol, ketane or ester, and in particular, the lower aliphatic alcohols containing from 1 to 4 carbon atoms and the lower aliphatic ketanes containing from 3 to 5 carbon atoms.

The precipitation process may be combined with the step of wetting the polymer powder with the alkali metal halide solution by employing a quantity of the halide solution as the non-solvent for precipitation of the polymer, and recovering the excess amount of halide solution by filtration, decantation or otherwise until the amount of halide solution remaining in the wet cake is from 1 to 5 times the weight of the polymer and contains not more than 0.5% by weight of the alkali metal halide based on the dry weight of the polymer.

The amount of water employed to disolve the alkali metal halide in the non-solvent is a critical feature of the process. Generally, the least possible amount required to ensure solution should be employed. The greater the amount of water and the larger the crystals of the alkali metal halide deposited on the particles of the partially crystaline hydrocarbon polymer, the less effective will be the nucleation.

An essential step, however, in preparing the compositions of this invention is quenching of the molten material after mixing, since it is this crystallization step which produces the desirable results hereinabove described. The quenching can take place in any suitable apparatus, such as by the use of cooling rolls in contact with molten extruded film, etc. The quenching can be achieved by contact with a cool fluid, such as air or a liquid. The temperature after quenching should be below 100° C. and preferably not above 95° C. (the molten resin being at 105 to 300° C.). In a particular embodiment, quenching can take place on a substrate, such as a paper base, in contact with a rubber roll pressing against the paper, the molten film being also pressed against the paper by a smooth-surfaced metal quenching roll, the paper and molten film meeting at the nip of these rolls.

Another process involving rapid cooling from the melt is the flash spinning process. In this process, a solution of the polymer at high pressure and temperature is forced through the orifice of a spinnerette, whereupon the solvent flashes off and the polymer separating from the solution is cooled below the crystallization temperatures by the latent heat of vaporization of the solvent. At the same time, pressure, generated by the solvent vapor within the filament, fibrillates and strengthens the filament. Heretofere, when attempts were made to flash spin polypropylene, the fibers produced were pliable and of no utility. When polypropylene, nucleated as hereinabove described, was employed in the flash spinning process useful fibers were produced.

The invention is illustrated further by means of the following examples.

EXAMPLE 1

2,500 grams of branched polyethylene ("Alathon" 10 Polyethylene Resin, manufactured by E. I. du Pont de Nemours and Company) was dry blended with 2.5 grams of an estersil, namely butanol-modified silica having an ultimate particle size of 8 to 10 millimicrons and prepared by the method of United States Patent 2,657,149), and the resulting mixture was further worked in a Banbury mixer at 125 to 130° C. for 10 minutes. The resulting product was subdivided in a Wiley mill and extruded into film. The extrusion was performed on a 1½ inch extruder equipped with blown film die and take-up assembly. The conditions of extrusion were:

| | |
|---|---|
| Melt temperature _____° C__ | 175 |
| Throughput _____grams/min__ | 130 |
| Blow ratio _____ | 1.65 |
| Take-up rate quench air _____ft./min__ | 21.5 |
| Temperature quench air _____° C__ | 32 |
| Pressure _____inch water__ | .6 |
| Film thickness _____mils__ | 1.5 |

For comparison, polyethylene of the same lot was similarly worked, subdivided and extruded, but in the absence of additive. In another control run, the unmodified polyethylene was treated in the absence of the additive and without "Banburying." The following table records a description of the film obtained in each instance.

Table I.—Effect of 1,000 P.P.M. estersil on polyethylene crystallization

| Composition | Trans-parency [1] | Haze,[2] percent | Brittle-ness [3] | Block,[4] lbs. | Slip [5] |
|---|---|---|---|---|---|
| Resin plus estersil | 425-450 | 6 | 21 | 0.52 | 1.2 |
| Resin, without additive | 310-350 | 8.6 | 40 | 0.87 | 1.5 |
| Same, without "Banburying" | 200-250 | 11.3 | 46 | 0.92 | 1.3 |

[1] American Optical Company Meter (arbitrary scale).
[2] Gardner Hazemeter.
[3] Rating 0-50, 50 indicating all failures were brittle.
[4] Force required to peel apart two 2 inch x 4 inch sections of films.
[5] Coefficient of sliding friction.

EXAMPLE 2

A concentrate was prepared by working a dry blend of 250 grams of branched polyethylene and 10 grams of hydrophilic silica having an ultimate particle size of 8 to 20 millimicrons. The blend was milled at 105–135° C. for 15 minutes in a Banbury mixer. The extrudate from the mixer was cooled and finely subdivided in a Wiley mill. The resulting concentrate was then dry-blended with cube-cut branched polyethylene to obtain four blends for extrusion at concentrations set forth in Table II. The four blends of cubes and concentrate were extruded into films under the same conditions as described in Example 1, with the results set forth in Table II.

Table II.—Effect of varying the number of nuclei on properties of crystallized polyethylene (silica as additive)

| Blend No. | Trans-parency | Haze, percent | Brittle-ness | Block | Slip |
|---|---|---|---|---|---|
| 1. (100 p.p.m. silica) | 285 | 8.7 | 39 | 0.65 | 1.26 |
| 2. (250 p.p.m. silica) | 309 | 5.2 | 19 | 0.26 | 1.51 |
| 3. (500 p.p.m. silica) | 325 | 4.1 | 23 | 0.30 | 1.40 |
| 4. (1,000 p.p.m. silica) | 326 | 4.2 | 30 | 0.21 | 1.33 |
| Control | 262 | 11.0 | 46 | 0.87 | 1.20 |

EXAMPLE 3

Example 2 was repeated using the estersil of Example 1 in place of the silica composition of Example 2. The results are reported in Table III.

Table III.—Effect of varying the number of nuclei on properties of crystallized polyethylene (estersil as additive)

| Quantity of Additive, p.p.m. | Trans-parency | Haze, percent | Brittle-ness | Block | Slip |
|---|---|---|---|---|---|
| 100 | 272 | 10.6 | 38 | 0.53 | 1.3 |
| 500 | 365 | 4.2 | 26 | 0.12 | 1.1 |
| 1,000 | 378 | 3.7 | 23 | 0.14 | 1.0 |
| Control | 261 | 11.0 | 42 | 0.73 | 1.3 |

The effect of the additives in each of the foregoing examples on crystallization of polyethylene film, as determined by measurement of density, crystallization rate at 95° C. and equilibrium level of crystallinity at 95° C., was determined with results recorded in Table IV.

Table IV.—Effect of additives on chrystallization of polyethylene

| Sample | Film Density, gm./cc. | 95° C. Time of Nucleation, sec. | 95° C. Rate of Crystallization, percent/min. | Equilibrium Level of Crystallinity, 95° C. |
|---|---|---|---|---|
| METHOD OF EXAMPLE 1 | | | | |
| 1. (1,000 p.p.m. estersil) | .9219 | 1.2 | 168 | 21.3% |
| 2. Banburyed "Alathon" 10 | .9203 | 3.6 | 136 | 21.8% |
| 3. Control "Alathon" 10 | .9180 | 6.5 | 109 | 21.3% |
| METHOD OF EXAMPLES 2 AND 3 | | | | |
| 1. (100 p.p.m. silica) | .9193 | 3.8 | 133 | 21.3% |
| 2. (250 p.p.m. silica) | .9225 | 1.3 | 169 | 21.6% |
| 3. (500 p.p.m. silica) | .9224 | 1.2 | 172 | 21.1% |
| 4. (1,000 p.p.m. silica) | .9220 | 1.4 | 175 | 21.1% |
| Control for 1-4 | .9183 | 6.4 | 110 | 21.3% |
| 5. (100 p.p.m. estersil) | .9210 | 2.9 | 126 | 21.7% |
| 6. (500 p.p.m. estersil) | .9223 | 1.3 | 165 | 21.2% |
| 7. (1,000 p.p.m. estersil) | .9224 | 1.2 | 162 | 21.4% |
| Control for 5-7 | .9181 | 6.5 | 108 | 21.3% |

The "Time of Nucleation" referred to in the foregoing table is the time which elapses at 95° C. before observable crystallization commences. The "Rate of Crystallization" is the rate of change in crystallinity, in percent crystallinity per minute, between 25% of the equilibrium level of crystallinity and 50% of the equilibrium crystallinity.

Blown films made by the methods of Examples 1–3, when tested by a plurality of methods, were shown to have toughness considerably greater than that of the controls.

EXAMPLE 4

A sample of linear polyethylene had a density (annealed 1 hr.) of .9566 and stiffness of 96,700 p.s.i. After milling on a rubber mill, it had a density of .9573. When similarly milled in the presence of 400 p.p.m. of estersil, the density reached .9582 (stiffness 112,800 p.s.i.), and when 1000 p.p.m. of esteril was employed, the density was .9582. In a similar experiment using linear polyethylene from the same source, and using 1000 p.p.m. of alumina (particle size ca. 20 millimicrons) in place of the added estersil, the product had a density of .9583, and a stiffness of 112,100. Stiffness was a density-determined property in this experiment.

EXAMPLE 5

Polyethylene containing 300 p.p.m. of oleamide was mixed with 1000 p.p.m. of the estersil of Example 1 in a "Ko-Kneader" mixing device, and the resulting mixture was converted to a blown film, which was air quenched from a melt temperature of 175° C. to below 100° C. The film was transparent and had about one-half of the haze of film similarly made from the oleamide-polyethylene mixture without the added estersil.

EXAMPLE 6

Partially crystalline polypropylene having a density of 0.9013 was milled, in a molten state, with 1,000 p.p.m. of the estersil employed in Example 1, until a uniform mixture was obtained. The resulting product, after cooling to ordinary temperature, had a density of 0.9040, as measured under the same conditions as the initial density. The increased density was accompanied by a decrease in spherulite size and an increase in total crystallinity.

EXAMPLE 7

12 grams of a partially crystalline polyethylene having a density of about 0.93 after conditioning at 100° C. for 1 hour, and which was prepared by a free radical high pressure process, was dissolved in 2 liters of boiling xylene containing 0.1 gram of "Santowhite Powder" antioxidant. The solution was slowly poured into 9½ liters of acetone which was violently agitated. The polymeric precipitate was filtered and washed three times with 500 ml. quantities of methanol.

One-half of polyethylene, comminuted by the above procedure, 6 grams dry weight, was added to a solution of 1 gram of caesium chloride in 25 ml. of water and 500 ml. of methanol, and the mixture was vigorously agitated for half an hour. The slurry was allowed to stand for a further hour and then filtered. The weight of the wet cake was 11 grams. The polymer was then dried over night at 85° C. in a vacuum oven. The concentration of caesium chloride in the product was 0.2%.

The remaining half of the dry weight of polymer precipitated and dried and was employed as a control sample.

The rate of crystallization was measured by infrared spectrometry and compared with the rate of crystallization of the control.

|  | Control | Nucleated with 0.2% CsCl |
|---|---|---|
| Rate of crystallization, percent crystallization/minute at 100° C | 10.3 | 18 |
| Induction time, seconds | 33 | 6 |

Films of the caesium chloride, nucleated polyethylene, which had been compression molded above the melting point of the polymer between sheets of aluminum foil then quenched by plunging the molding assembly into ice-water, were markedly more transparent to the eye than films prepared in the same manner from the control sample.

EXAMPLE 8

A sample of the same low-density partially crystalline polyethylene employed in Example 7 was nucleated with about 0.5% by weight of sodium chloride using the technique described in Example 7. The following results were obtained for the rate of crystallization.

| Temperatures of Quench | Control Polyethylene | | Sodium Chloride Nucleated | |
|---|---|---|---|---|
|  | Rate, Percent/min. | Induction time, seconds | Rate, Percent/min. | Induction time, seconds |
| 102 | 3.0 | 90 | 8.6 | 14 |
| 100 | 9.2 | 44 | 20.9 | 7.0 |
| 98 | 27.6 | 20 | 43.3 | 5.0 |
| 95 | 56.3 | 11.5 | 70.5 | 4.5 |

EXAMPLE 9

Following the procedure of Example 7, the same low density polyethylene employed in Examples 7 and 8 was nucleated with about 0.5% of potassium bromide. The following rates of crystallization and nucleation induction times were observed at a quench temperature of 100° C.

|  | Rate of Crystallization, Percent/minute | Induction Time, seconds |
|---|---|---|
| Control | 12.5 | 29 |
| KBr Nucleated polymer | 34.5 | 5 |

EXAMPLES 10–14

In the following examples partially crystalline polypropylene was nucleated using a solution process. Three pounds of the polymer were dissolved in 6 gallons of xylene in a ten gallon steam-heated autoclave. After heating to the boiling point for 20 minutes with stirring, the solution was blown through a 5/16" internal diameter copper tube into a 50 gallon open kettle containing 30 gallons of methanol. The salt, dissolved in a minimum quantity of water, had been previously added to the methanol. The amount of salt was calculated assuming that the amount of salt desired for nucleation should be contained in the methanol absorbed in the precipitated wet polymer. Generally, the amount of methanol thus absorbed was about ten times the weight of the polymer.

The polymer precipitated from the methanol as a stringy fibrous product from which the methanol-xylene mixture could be drained off. The precipitate was then washed for 15 minutes with 20 gallons of fresh methanol solution, filtered, squeezed dry by hand, and dried in an oven over night at 80° C. under nitrogen.

The rates of crystallization of the resins and control sample prepared by precipitation without salt added were then determined by infrared spectrometry.

| Example | 10 | 11 | 12 | 13 | 14 |
|---|---|---|---|---|---|
| Salt added | None | NaCl | NaCl | NaCl | KBr |
| Salt concentration, parts/million | | 134 | 2,700 | 900 | 1,600 |
| Quench temp., °C | 120 | 120 | 120 | 118 | 120 |
| Rate of Crystallization percent/min | 32.6 | 112 | 213 | 151 | 95 |
| Induction time, secs | 28 | 19 | 6.5 | 4 | 7 |

The polymers of Examples 11 and 12 were flash spun from methylene dichloride solution. The solution contained 14% by weight of polymers at a temperature of 200° C. and a pressure of 650 p.s.i. The spinnerette was an 0.040 x 0.040" hole followed by an 0.312" x 0.500" cylindrical shroud.

The product obtained from the polymer of Example 11 had a denier of 370, but the tenacity was too small to measure. The polypropylene nucleated with 2,700 parts/million of sodium chloride (Example 12) was spun to a fiber of 330 denier with a tenacity of 0.45 gram/denier.

The examples hereinabove described are illustrative only, and it is to be understood that many different ways of practicing the invention will occur to those who are skilled in the polymer art. Thus, the invention may be practiced by using particle sizes of larger diameter than the sizes illustrated although this results in disadvantages. When alumina, silica, and calcium carbonate were used in particle sizes of 2 to 5 microns, the slip and block properties of polyethylene were improved, but the particles were detectable in the film by the naked eye, i.e. the appearance was adversely affected.

Moreover, it is to be understood that there are various known expedients for controlling the size and even the shape of solid additives, as well as a wide variety of commercial solid materials which are stable and which have various forms or shapes of the desired particle size. One method for producing particles of small size is to choose an additive, such as rosin, which is soluble in the molten resin, or liquid at the temperature of the molten resin, and which crystallizes at about the same temperature as does the resin. In the latter situation, crystals of the additive necessarily go through an initial stage of growth which is characterized by extremely minute crystals, hence the addtive necessarily has crystals of suitable size in the environment wherein the nucleation occurs. Among the stable commercial materials having known particle size, some also have characteristic dimensions, and it is thus possible to vary or control the shape, i.e. dimensions, of the particles of additive, which in some instances appears to be desirable. Thus, silica particles are frequently spherical, while alumina particles can be obtained in the form of needles. Magnesium oxide platelets 5 millimicrons thick and 500 millimicrons across are also effective. Thus, it is apparent that while in some instance the configuration or shape of the crystalline additive may be a significant determinant of crystallite or spherulite size in the crystallizable resin, the phenomenon of nucleation is not limited to any particular shape or crystal form, but is encountered with crystals of the widest variety of shape or form.

Although both hydrophilic and hydrophobic silicious materials are highly effective in the practice of this invention, the results hereinabove described are especially surprising in those embodiments employing hydrophilic solids, as distinguished from such organophilic solids as estersils. Polyethylene films containing estersils have been known heretofore, and it was known that they exhibit extraordinary clarity, even at loadings of 10% by weight, or higher. The present invention is concerned with a method which makes possible the use of other colloidal solids in producing clear products, although the quantities of these other solids are limited, i.e. not as large as those which may be used in clear estersil-polyethylene compositions. This method is based on nucleation, where clarity in polyethylene containing heavy loadings of estersils evidently is the result of other phenomena, in addition to nucleation.

The invention is highly useful in improving the quality (clarity, frictional properties and strength) of polymeric films, shaped objects, fibers, and the like where such improvement reflects faster crystallization, smaller crystalline domains, and higher levels of crystallinity for given time-temperature treatments of the polymers hereinabove mentioned.

We claim:
1. A method for producing a nucleated composition comprising a partially crystalline thermoplastic polyolefin polymer in intimate mixture with a nucleating agent consisting of particles of a salt having a particles size less than $1.0\mu$, said salt being selected from the class consisting of the halides of sodium, potassium, rubidium and caesium, which comprises the steps of (1) comminuting said hydrocarbon polymer to a finely divided powder having a particle size less than $10\mu$, (2) mixing said powder with from 1 to 10 parts by weight of a solution of said salt in a non-solvent for the said polyolefin selected from the class consisting of aliphatic alcohols having from 1 to 4 carbon atoms and aliphatic ketones having from 3 to 5 carbon atoms, together with substantially the minimum quantity of water required to dissolve said salt, the amount of said salt being from 0.01 to 0.5% by weight based on the said hydrocarbon polymer, and (3) drying said mixture at a temperature below the crystalline melting point of said polymer.

2. A method for producing a nucleated composition comprising a partially crystalline thermoplastic polyolefin polymer in intimate mixture with a nucleating agent consisting of particles of a salt having a particle size less than $1.0\mu$, said salt being selected from the class consisting of sodium, potassium, rubidium and caesium halides which comprise the steps of (1) dissolving said hydrocarbon polymer in an aromatic solvent at elevated temperatures to form a solution containing from 1 to 5 percent by weight of said hydrocarbon polymer, (2) pouring the resultant solution into from 2 to 5 volumes of a solution consisting essentially of non-solvent for the said polyolefin selected from the class consisting of aliphatic alcohols containing from 1 to 4 carbon atoms and the said salt, (3) removing excess liquid from the polymer precipitated in step 2 until the remaining liquid is from 1 to 10 parts by weight percent of polymer and contains from 0.01 to 0.5 percent by weight of said salt based on the weight of said polymer and (4) drying the polymer-liquid mixture at a temperature below the crystalline melting point of said polymer.

3. Process of claim 1 in which said polymer is partially crystalline polyethylene.

4. Process of claim 1 in which said polymer is partially crystalline polypropylene.

5. A molding composition which comprises a partially crystallizable thermoplastic polymer of an alpha-olefin which partially crystallizes upon molding from a molten state intimately mixed with particles of a salt selected from the class consisting of the halides of sodium, potassium, rubidium and caesium, said particles having a size less than 1µ and having a concentration of 0.01 to 0.5 percent by weight based on said hydrocarbon polymer.

6. A molding composition of claim 5 in which said hydrocarbon polymer is partially crystalline thermoplastic polyethylene.

7. A molding composition of claim 5 in which said hydrocarbon polymer is partially crystalline polypropylene.

References Cited by the Examiner

UNITED STATES PATENTS

| 2,325,060 | 7/1943 | Ingersoll | 8—115.5 |
| 2,748,105 | 5/1956 | Becker et al. | 260—85.3 |
| 2,834,768 | 5/1958 | Friedlander et al. | 260—93.7 |

FOREIGN PATENTS 549,466   1/1957   Belgium.

ALLAN LIEBERMAN, *Acting Primary Examiner.*

LEON J. BERCOVITZ, MORRIS LIEBMAN, ALEXANDER H. BRODMERKEL, *Examiners.*

B. S. LEON, K. B. CLARKE, J. S. WALDRON,
*Assistant Examiners.*